United States Patent [19]

Skidmore

[11] 3,855,176

[45] Dec. 17, 1974

[54] LINER COMPOSITION FOR ROCKET MOTORS COMPRISING CROSSLINKED CARBOXY TERMINATED POLYBUTADIENE WITH INERT FILLER

[75] Inventor: Paul H. Skidmore, Frostburg, Md.

[73] Assignee: The United States of America as represented by the Secretary of the Navy, Washington, D.C.

[22] Filed: Feb. 16, 1970

[21] Appl. No.: 14,831

[52] U.S. Cl.............. 260/42.28, 60/39.47, 102/103, 260/836, 260/837 R
[51] Int. Cl........................ C08f 45/04, C08f 45/08
[58] Field of Search........... 117/136, 137; 260/41 R, 260/41 A, 41 B, 42.28, 836, 837 R; 102/103

[56] References Cited

UNITED STATES PATENTS

| | | | |
|---|---|---|---|
| 3,427,805 | 2/1969 | Osburn | 102/102 X |
| 3,433,158 | 3/1969 | Pierce | 102/103 |
| 3,446,018 | 5/1969 | Macbeth | 102/103 X |
| 3,487,349 | 12/1969 | Halloran | 260/41 R X |

*Primary Examiner*—Leland A. Sebastian
*Attorney, Agent, or Firm*—R. S. Sciascia; J. A. Cooke

[57] ABSTRACT

A liner composition, suitable for and effective in bonding composite propellants to the chamber wall and internal components of rocket motors which contains carboxy-terminated polybutadiene, a tri-epoxy curing agent, colloidal silica as a reinforcing inert filler, and a chromium octoate catalyst.

7 Claims, No Drawings

LINER COMPOSITION FOR ROCKET MOTORS COMPRISING CROSSLINKED CARBOXY TERMINATED POLYBUTADIENE WITH INERT FILLER

BACKGROUND OF THE INVENTION

This invention relates generally to a liner composition for rocket motors and more particularly to a polymer liner composition for bonding a composite propellant to the chamber wall and internal components of a rocket motor.

Among the desirable characteristics of a linear composition for rocket motors are (1) the ability to form and maintain a strong bond with a propellant, (2) the ability to minimize the migration of plasticizers from the propellant, (3) the ability to maintain good physical properties over a wide temperature range, (4) good aging and stability during extended storage periods and, (5) the simple adaptability to conventional spray application equipment. Notably, however, the prior art liner compositions have left room for appreciable improvement in at least one or more of these desirable characteristic areas. Especially noteworthy has been the high cost associated with the application of the prior art liner compositions to the internal walls of the rocket cases, due to the requirement of special tooling, special spray apparatus and specially trained personnel.

SUMMARY OF THE INVENTION

Accordingly, it is one object of the present invention to provide a liner composition for rocket motors.

Another object of this invention is to provide a liner composition for rocket motors especially suitable for bonding a composite propellant.

Still another object of this invention is to provide a liner composition for rocket motors which forms bonds with composite propellants superior to those heretofore attained.

A further object of the instant invention is to provide a liner composition for rocket motors which is more stable during extended storage than those heretofore known.

A still further object of this invention is to provide a liner composition for rocket motors which is applied with only slight modifications to conventional spray equipment thereby reducing equipment costs, minimizing personnel training and readily adaptable to high volume motor production.

Still a further object of the instant invention is to provide a liner composition for rocket motors which in addition possesses those other desirable characteristics enumerated hereinbefore, among others.

Still another further object of this invention is to provide a precursor liner composition.

These and other objects are achieved by a liner composition comprising carboxy terminated polybutadiene, a reinforcing inert filler such as colloidal silica, a tri-epoxy resin curing agent and a curing catalyst.

DESCRIPTION OF THE PREFERRED EMBODIMENTS

The liner composition of the present invention is prepared by first incorporating the reinforcing inert filler into the carboxy-terminated polybutadiene prepolymer. The reinforcing inert filler, which is preferably colloidal silica (Cab-O-Sil, a product of the Cabot Corporation) imparts thixotropy and reinforcement properties to the composition. The thixotropic nature of the liner composition of this invention allows mobility during application but minimizes flow after deposition on the rocket motor chamber wall. It is to be understood, however, that the liner composition of this invention may be prepared and used, if desired, without any reinforcing inert filler. However, among some other inert fillers which may be employed, if desired, in place of colloidal silica are for example, bentomites, carbon blacks, magnesium silicates and any of the previously used reinforcing inert fillers of this type. Accordingly, none or only relatively small quantities of the reinforcing inert filler are incorporated into the line composition, e.g., an amount within the range of from about 0 to about 3.5 percent by weight. Preferably though, the reinforcing inert filler is utilized in an amount in the range of from about 1.5 to about 3.5 percent by weight with optimum results being achieved at about a 2 percent by weight content of the total composition. It is further desirable that the reinforcing inert filler employed be in finely divided form so as to prevent orifice blockage in the spray nozzles during application.

The prepolymer carboxy-terminated polybutadienes within the scope of this invention may be any of those commercially available such as Butarez Type 2, a product of the Phillips Petroleum Company, HC434, a product of Thiokol, Hycar CTB, a product of B. F. Goodrich, Telagen, a product of General Tire and Rubber, and the like. This prepolymer comprises from about 91 to about 96 percent by weight of the total liner composition with optimum results being obtained at about 94 percent. When a reinforcing inert filler is used, it and the prepolymer are mixed employing conventional procedures such as via the utilization of a three-roll paint mill or other type mixers. This filled carboxy-terminated polybutadiene can, if desired, be stored for an indefinite period of time.

Continuing the preparation, a tri-epoxy resin for curing purposes, herein-identified as a tri-epoxy resin curing agent, and a curing catalyst are added to the filled or non-filled carboxy-terminated polybutadiene prepolymer just prior to application of the total liner composition to the chamber wall. The use of a tri-epoxy curing agent aids in producing a liner composition with a high crosslink density thereby minimizing the migration of plasticizers from the propellant and further enhancing the mechanical properties of the liner composition at elevated temperatures.

Any tri-functional epoxide resin curing agents may be used for the purposes of this invention. Among others, some of these tri-epoxy resin curing agents within the scope of this invention are for example, ERL 0500 and ERL 0510, both products of Union Carbide, and which are tri-functional epoxides derived from epichlorohydrin and p-aminophenol, D.E.N. 438, a product of Dow Chemical Company and which is a triglycidyl ether of phenolformaldehyde novalac, EPON 812, a product of Shell Chemical Company and which is a triglycidyl ether of glycerol and epichlorohydrin, the triglycidyl ether of trihydroxybiphenyl, and EPON X-801, a product of Shell Chemical Company, and EPOTUF 427–60E, a product of Reichhold Chemicals Inc., White Plains, N.Y. and the like. Whichever tri-epoxy curing agent is employed it is added to the liner composition in an amount within the range of from about 3 to about 5 percent by weight, preferably, however, in an amount of about 4 percent by weight of the total composition.

In addition, a curing catalyst is added to the liner composition in conjunction with the tri-epoxy curing agent just described above. This combination, i.e., curing agent plus catalyst, permits a partial cure of the case bond liner, prior to propellant casting, which enables the liner composition to remain reactive for intercure with the propellant. As a result, the liner composition of this invention is more stable during long term motor storage than prior art liner systems.

Specifically, some organo-metallic salt curing catalysts, among others, that are encompassed within the scope of this invention are, for example, chromium octoate, ferric acetylacetonate, ferric linoleate, iron octoate, stannous octoate and the like. For purposes of enhancing catalyst distribution and mix uniformity, the curing catalyst is added to the composition either as a dispersion, e.g., in dioctyl adipate or in a non-carboxylated polybutadiene (NF Butarez) or in a mixture thereof; or for the same reasons the curing catalyst may be added to the composition in a solution with a solvent such as N,N',bis(1,4-dimethylpentyl)-p-phenylene diamine which is known as Eastazone-33 made by Eastman Chemical. The catalyst dispersion or solution is added to the liner composition in amounts within the range of from about 0.2 to about 0.7 percent by weight of the total composition, wherein the organo-metallic salt curing catalyst per se is about 20 percent by weight of the total dispersion or solution throughout the above weight percent range. Although not practical due to the extreme difficulty to obtain thorough catalyst distribution and mix uniformity, the organo-metallic curing catalyst of this invention may be added to the composition without the aid of a dispersion medium or selective solvent.

The complete liner composition may then be partially cured, after application, upon heat treatment and for 5 hours at about 150°F, prior to casting with the propellant. The partially cured liner compositions of this invention are stable during extended storage periods.

The general nature of the invention having been set forth, the following examples are presented as specific illustrations thereof and also so that the invention be better understood. Furthermore, it will be understood that the invention is not limited to these examples but is susceptible to various modifications that will be recognized by one of ordinary skill in the art.

EXAMPLE 1

| Liner Composition | % by weight |
| --- | --- |
| CTPB Butarez Type 2 (carboxyl content 1.6 - 1.9%) | 93.76 |
| Cab-O-Sil M-5 | 1.88 |
| ERL 0510 (equiv.wt. 95-107)[1] | 3.94 |
| Chromium octoate dispersion | 0.42 |

EXAMPLE 2

| Liner Composition | % by weight |
| --- | --- |
| CTPB Butarez Type 2 (carboxyl content 1.6 - 1.9%) | 95.56 |
| ERL 0510 (equiv.wt. 95-107)[1] | 4.01 |
| Chromium octoate dispersion | 0.43 |

| | % weight |
| --- | --- |
| [1]catalyst dispersion - di(2-ethylhexyl) adipate | 40.0 |
| polybutadiene (non-carboxylated) | 40.0 |
| chromium octoate | 20.0 |

The composition of Example 1 was prepared by first incorporating the Cab-O-Sil into the CTPB Butarez Type 2 on a three-roll paint mill. The tri-epoxy (ERL 0510) and chromium octoate dispersion (previously prepared) were added to the filled CTPB and mixed with a laboratory air stirrer using a propeller type blade. After a mix period of 15 minutes (scraping down the side walls and bottom manually each 5 minutes) the mix was evacuated in a dessicator using a vacuum pump. After all foaming subsided, the liner was removed and applied as required for various specimens. All liners were partially cured 4 to 6 hours at 150°F prior to casting with propellant.

The liner composition of Example 2 was prepared in the same manner as for the composition of Example 1 except for the milling operation which is obviously not necessary.

The table below is a summary of various mechanical properties of the liner compositions of this invention.

Table

| Composition of Example (¼" specimens) | Test Temp. & Test Rate | Average Tensile psi | Average Elongation % | Average Modulus psi |
| --- | --- | --- | --- | --- |
| 1 | 77°F & 0.74 in/min/in | 130 | 112 | 211 |
| 2 | 77°F & 0.74 in/min/in | 69 | 85 | 138 |
| 1 | 170°F & 0.74 in/min/in | 113 | 77 | 211 |
| 2 | 170°F & 0.74 in/min/in | 49 | 38 | 181 |

The liner compositions of this invention are particularly well suited for adhesion and compatibility with Hercopel composite propellants (based on a binder of carboxy-terminated polybutadiene) made by Hercules Incorporated, however, they may also be employed with any composite propellant which utilizes an elastomeric polymer containing not less than about two free carboxyl groups per molecule, with an aziridinyl and/or epoxide curing agent.

Obviously, numerous modifications and variations of the present invention are possible in the light of the above teachings. For example, for commercial purposes a precursor liner composition consisting essentially of the carboxy-terminated polybutadiene, reinforcing inert filler and organo-metallic salt catalyst may be mixed wherein the weight percents of the ingredients are such that upon subsequent addition thereto (i.e., just prior to application to the rocket motor chamber wall) of the tri-epoxy curative ingredient, the total liner composition would be comprised of those same weight percents of ingredients hereinbefore disclosed.

It is therefore to be understood that within the scope of the appended claims the invention may be practiced otherwise than as specifically described herein.

What is claimed and desired to be secured by Letters Patent of the United States is:

1. A liner composition for rocket motors consisting of a carboxy terminated polybutadiene; an organo-metallic salt catalyst; a tri epoxy resin curing agent selected from the group consisting of the trifunctional epoxide of epichlorohydrin and p-aminophenol, the triglycidyl ether of epichlorohydrin and phenol-formaldehyde novolac and the triglycidyl ether of epichlorohydrin and glycerol; and a reinforcing inert filler material selected from the group consisting of colloidal silica, bentonite, carbon black and magnesium silicate; and wherein said carboxy terminated polybutadiene is present in an amount of from about 91 to 96 weight percent, said tri epoxy resin curing agent is present in an amount of from about 3 to about 5 weight percent and said inert filler is present in an amount from about 1.5 to about 3.5 weight percent.

2. The liner composition of claim 1 wherein said organo-metallic salt catalyst is selected from the group consisting of chromium octoate, ferric acetylacetonate, ferric linoleate, iron octoate and stannous octoate.

3. The liner composition of claim 2 wherein said catalyst is chromium octoate.

4. The liner composition of claim 1 wherein said organo-metallic salt catalyst is in a dispersion medium or solvent medium.

5. The liner composition of claim 4 wherein said dispersion medium is selected from the group consisting of dioctyl adipate, polybutadiene and mixtures thereof and said solvent medium is N,N',bis(1,4-dimethylpentyl)-p-phenylene diamine.

6. The liner composition of claim 4 wherein total mixture of said organo-metallic salt catalyst and said dispersion medium or the total solution of said organo-metallic salt catalyst and said solvent comprise from about 0.2 to about 0.7 weight percent of the total liner composition.

7. The liner composition of claim 1 wherein said inert filler is silica.

* * * * *